_United States Patent_ [19]

Tung

[11] 4,254,001

[45] Mar. 3, 1981

[54] RANDOM ELASTOMERIC COPOLYESTERS

[75] Inventor: William C. T. Tung, Tallmadge, Ohio

[73] Assignee: The Goodyear Tire & Rubber Company, Akron, Ohio

[21] Appl. No.: 116,703

[22] Filed: Jan. 30, 1980

Related U.S. Application Data

[63] Continuation-in-part of Ser. No. 40,016, May 17, 1979, abandoned.

[51] Int. Cl.$^3$ .................... C08G 63/66; C08G 63/18
[52] U.S. Cl. ................................ 260/22 D; 528/301
[58] Field of Search ...................... 260/22 D; 528/301

[56] References Cited

U.S. PATENT DOCUMENTS

| | | | |
|---|---|---|---|
| 3,235,520 | 2/1966 | Crowell | 260/22 |
| 3,383,343 | 5/1968 | Mohajer et al. | 260/22 |
| 3,390,108 | 6/1968 | Keck et al. | 260/7.5 |
| 3,391,073 | 1/1976 | Jackson et al. | 260/22 D |
| 3,795,644 | 3/1974 | Jackson et al. | 260/22 D |
| 3,915,913 | 10/1975 | Jackson et al. | 260/22 D |

_Primary Examiner_—Earl A. Nielsen
_Attorney, Agent, or Firm_—J. P. Ward

[57] ABSTRACT

This invention relates to random linear copolyesters containing units of terephthalic acid, butane diol, polytetramethylene glycol and dimer acid. The copolymers are elastic materials and can be made into films, fibers and molded products.

6 Claims, No Drawings

RANDOM ELASTOMERIC COPOLYESTERS

TECHNICAL FIELD

This application is a continuation-in-part of my copending application Ser. No. 40,016 filed May 17, 1979, now abandoned.

The invention described herein relates to random linear copolyesters having elastomeric properties and to shaped articles prepared from the copolyesters.

BACKGROUND ART

The prior art discloses elastic polyester resins made of certain ordered block copolymers as disclosed in U.S. Pat. Nos. 3,023,192 and 3,954,689. Also, elastomeric properties are obtained in copolyesters having branched chain compounds in their structure as illustrated in U.S. Pat. No. 4,013,624 and esters that contain side chains as shown in U.S. Pat. No. 3,890,279. The present elastomeric copolyesters are random copolymers and different from the prior art materials by being straight chain polymers that contain significant amounts of polyalkylene groups within the polymer chain. These materials crystallize rapidly into opaque solids that are tough and elastic. They have a wide range of service temperatures and can be extruded into rods, tubes, hose, filaments and films and they can be injection molded or rotational molded into tires and parts having industrial uses.

DETAILED DESCRIPTION

The present copolyesters can be made by the usual procedures for making high molecular weight polyesters, including ester interchange, esterification and polycondensation or a combination of these processes. They are essentially random straight chain polymers without any dangling (i.e. pendant) groups attached either to the acid residues or the glycol residues and are copolyesters in that they contain units of different polyester-forming materials within the polymer chains.

It is an object of this invention to provide a synthetic polyester material capable of being formed into filaments, films and molded articles which possess high elastic recovery.

This objective is accomplished by providing elastomeric, random, linear copolyesters having intrinsic viscosities ranging from about 0.6 to about 1.0 as determined in a 60/40 by volume mixed solvent system of phenol and tetrachloroethane at 30° C. and melting points ranging from about 180° C. to about 220° C., said copolyesters comprising the polymeric reaction product of a mixture of reactants consisting of (a) terephthalic acid or a lower $C_1-C_4$ dialkyl ester thereof,
(b) dimer acid,
(c) a poly(tetramethylene oxide)glycol having a molecular weight ranging from about 1000 to about 2000 and
(d) 1,4-butane diol in which mixture the amount of terephthalic acid or lower $C_1-C_4$ dialkyl ester thereof ranges from about 99.9 to about 85.0 mole percent and the amount of dimer acid ranges from about 0.1 to about 15.0 mole percent, said percentages being based on the total number of moles of said acid constituents or reactive equivalents thereof in said mixture and in which mixture the amount of poly(tetramethylene oxide)glycol ranges from about 2.0 to about 12.0 mole percent and the amount of 1,4-butane diol ranges from about 98.0 to about 88.0 mole percent, plus a molar excess of said 1,4-butane diol ranging from about 5.0 to 120.0 percent, said percentages being based on the total number of moles of said glycol constituents, less the molar excess of the 1,4-butane diol, in said mixture. A more preferred range for the acid constituents or their reactive equivalents in the above-defined reaction mixture is from about 99.5 to about 86.8 mole percent for the terephthalic acid or lower $C_1-C_4$ dialkyl ester thereof and from about 0.5 to about 13.2 mole percent of the dimer acid.

As noted hereinabove a molar excess of the 1,4-butane diol, ranging from about 5.0 to about 120 percent of the number of moles of this diol needed to react with the moles of acid constituents or their reactive equivalents in the mixture, is employed. This excess is employed in order to insure reasonable rates of reaction between the glycol constituents and the acid constituents or the reactive equivalents thereof. As a result of the use of this excess of the 1,4-butane diol, the molar ratio of all the glycol constituents to all of the acid constituents or their reactive equivalents in the mixture will range from about 1.05:1.0 to about 2.20:1.0.

The dimer acid useful in preparing the copolyesters constituting the present invention is itself prepared from an unsaturated fatty acid containing 18 carbon atoms such as linoleic and linolenic acid or the monohydric alcohol esters thereof. The actual preparation and structure of dimerized $C_{18}$ fatty acids are described in J.A.C.S. 66, 84 (1944) and U.S. Pat. No. 2,347,562, both of which are incorporated herein by reference. Several different grades of dimer acid are available from commercial sources and these differ from each other primarily in the amount of the monobasic and trimer acids fractions and the degree of unsaturation. It is preferred, for purposes of this invention, the dimer acid be substantially free of the monobasic and trimer acids fractions and essentially completely saturated. Two different grades of dimer acid, which are useful in preparing the copolyesters herein described and meet the above requirements and which are available from Emery Industries, Inc. under the trade name Empol, are Empol 1010 and Empol 1014. Empol 1010 dimer acid is reported as typically containing 97% dimer acid, 3% trimer acid and essentially no monobasic acids and extremely low unsaturation and Empol 1014 is reported as typically containing 95%, 4% and 1% of dimer, trimer and monobasic acids respectively.

The elastomeric, random, linear copolyesters of the present invention and derived from the reaction mixtures defined hereinabove are prepared by conventional and well-known techniques used in preparing high molecular weight linear polyesters. In general, the copolyesters are prepared by first subjecting the mixture of reactants to elevated temperatures under an inert gas atmosphere at atmospheric or superatmospheric pressures in the presence of a catalyst to promote the esterification or combined transesterification/esterification reactions, depending on the nature of the starting materials, between the glycol constituents and the acid constituents or reactive equivalents thereof comprising said mixtures. Known catalysts useful in promoting these reactions include the zinc, magnesium, calcium, manganese, lead and titanium containing compounds. The amount of catalyst used can be varied over a wide range. Generally, the amount used will be in the range of from about 0.005 to about 0.03 percent by weight based on the amount of reactants used. The temperatures normally employed to affect the esterification or combined transesterification/esterification reactions will generally range from about 150° C. to about 240° C. and preferably from about 190° C. to 230° C.

Following completion of the esterification or combined transesterification/esterification reaction, the low molecular weight oligomer product produced thereby is subjected to polycondensation. The polycondensation reaction will be carried out at temperatures ranging from about 220° C. to about 280° C. and preferably from about 240° C. to about 270° C. at pressures below 15 and preferably below 1 millimeter of mercury (mmHG) pressure in the presence of a polycondensation catalyst such as the known antimony, titanium, iron, zinc, cobalt, lead, manganese, niobium or germanium catalysts.

The following examples illustrate the preparation of the copolymers of the invention and set out some of their desirable properties. In these examples, parts or percentages are by weight unless otherwise specified.

EXAMPLE I

An elastomeric, random linear copolyester was prepared from a mixture of reactants consisting of 11.3 pounds of dimethyl terephthalate, 6.59 pounds of 1,4-butane diol (inclusive of a 33% molar excess), and 6 pounds of poly(tetramethylene oxide)glycol having a molecular weight of about 1000 (Polymeg 1000) were charged into a 25 pound reactor and reacted in the presence of 60 ppm of titanium, based on the weight of the charge, as catalyst at temperatures running from 174° C. to 215° C. After all the by-product methanol was distilled out, 1.6 pounds of dimer acid was added. The resultant mixture was further reacted at 215° C. for one hour. The pressure in the reactor was slowly reduced while the temperature was raised to 250° C. The polymerization was carried out at 254° C. and 0.5 millimeters of mercury pressure. Three hours later, the copolyester product was discharged. It had an intrinsic viscosity of 0.886. It was a white, tough, rubbery solid. It was ground and used for injection molding tests. The melting point was 206° C. (Intrinsic viscosity in the example of this specification was determined in a 60/40 phenol/tetrachloroethane mixed solvent at 30.0° C.)

EXAMPLE II

The same procedure as employed in Example I was followed to produce a copolyester of the invention except that the concentration of reactants in the reaction mixture were as follows:
Dimethyl terephthalate = 10.3 lbs.
Butane Diol = 6.21 lbs. (inclusive of a 33% molar excess)
Polymeg 1000 = 6 lbs.
Dimer Acid = 2.6 lbs.

The final intrinsic viscosity of the copolyester was 0.874 and the melting point was 190° C.

EXAMPLE III

The procedure of Example I was followed to produce a copolyester from a mixture of reactants as follows:
Dimethyl terephthalate = 9 lbs.
Butane Diol = 5.7 lbs. (inclusive of a 33% molar excess)
Polymeg 1000 = 6 lbs.
Dimer Acid = 4 lbs.

The copolyester product had an intrinsic viscosity of 0.869 and a melting point of 182° C.

EXAMPLE IV

The polymers prepared in the above examples were injection molded into ASTM test pieces. The test results are listed below:

| Example | Tensile @ Break | Elong. @ Break | Stress @ 100% Elong. | Tensile Set @ 100% Elong. | Hardness Shore A | Hardness Shore D |
|---|---|---|---|---|---|---|
| I | 3068 psi @ 480 Elong. | 480% (NB)* | 1789 psi | 47% | 93 | 46 |
| II | 2638 psi @ 515% Elong. | 515% (NB)* | 1592 psi | 44% | 93 | 45 |
| III | 1700 psi | 420% | 1145 psi | 37% | 89 | 34 |

*NB = No Break

Physical properties of films produced from copolyesters of this invention, by means of a flat die process, are set forth in Examples V, VI and VII below. In addition, the mole percent of each of the reactants in the reaction mixture used to prepare the copolyester employed in the films tested is also indicated. With respect to the mole percentages indicated for the two glycol constituents, the value listed for the 1,4-butane diol component is exclusive of the approximately 33 percent excess of this diol present in the reaction mixtures employed to produce the various copolyesters.

EXAMPLE V 99.5/0.5-98/2 Terephthalate/Dimerate - Butane Diol/Polymeg
1.1 mil thick          Heat Seal T = 440° F.
Tensile at Break       Break Elongation

| | | |
|---|---|---|
| MD | 10,700 psi | 360% |
| T | 6,500 psi | 520% |

EXAMPLE VI 95.4/4.6-90.1/9.9 Terephthalate/Dimer Acid - Butane Diol/Polymeg
1.4 mil thick          Heat Seal T = 415° F.
Tensile at break       Break Elongation

| | | |
|---|---|---|
| MD | 6,000 psi | 580% |
| T | 4,600 psi | 660% |

EXAMPLE VII 86.8/13.2-88.7/11.3 Terephthalate/Dimerate - Butane Diol/Polymeg
101.5 mil thick        Heat Seal T = 375° F.
Tensile at break       Break Elongation

| | | |
|---|---|---|
| MD | 2,500 psi | 740% |
| T | 2,200 psi | 710% |

MD = Machine Direction
T = Transverse Direction

Film of copolyesters of the invention are useful in a number of packaging applications. They can be used as protective films to package textiles, tires, tubes and other rubber products. Film having high elongation will be useful for packaging fresh red meats and other food products.

If desired, the properties of these copolyesters can be modified somewhat by the incorporation of plasticizers, lubricants, fillers, pigmenting agents and stabilizers.

As set out before, the copolyesters will have melting points in the range from about 180° C. to about 220° C. This broad range of melting points allows for a wide range of service temperatures for these copolyesters.

The expression "melting point" of the copolyesters as used in this specification is the minimum temperature at which a sample of polymer leaves a wet molten trail as it is drawn across the surface of a heated block of aluminum. Sometimes this temperature is called a polymer stick temperature.

Stabilizers are added to the copolyesters to provide additional stability against the deteriorating effects of heat or light. Phenols, amines, oximes, and salts of metals are suitable stabilizers.

The elastomeric copolyesters of this invention are characterized by high strength and high stretch modulus. These copolymers may be spun readily into yarns and into low denier filaments.

Yarns prepared from the copolyesters of this invention will find many uses in the textile and related fields. They may be uses in the manufacture of two-way stretch, woven and knitted articles. Also, they may find use in non-woven fabrics and as bonding materials in paper and in the non-woven fabrics.

While certain representative embodiments and details have been shown for the purpose of illustrating the invention, it will be apparent to those skilled in this art that various changes and modifications may be made therein without departing from the spirit or scope of the invention.

I claim:

1. As compositions of matter, elastomeric, random, linear copolyesters having intrinsic viscosities ranging from about 0.6 to about 1.0 as determined in a 60/40 by volume mixed solvent system of phenol and tetrachloroethane at 30° C. and melting points ranging from about 180° C. to about 220° C., said copolyester comprising the polymeric reaction product of a mixture of reactants consisting of
    (a) terephthalic acid or a lower $C_1$–$C_4$ dialkyl ester thereof,
    (b) dimer acid,
    (c) a poly(tetramethylene oxide)glycol having a molecular weight ranging from about 1000 to about 2000 and
    (d) 1,4-butane diol in which mixture the amount of terephthalic acid or lower $C_1$–$C_4$ dialkyl ester thereof ranges from about 99.9 to about 85.0 mole percent and the amount of dimer acid ranges from about 0.1 to about 15.0 mole percent, said percentages being based on the total number of moles of said acid constituents or reactive equivalents thereof in said mixture and in which mixture the amount of poly(tetramethylene oxide)glycol ranges from about 2.0 to 12.0 mole percent and the amount of 1,4-butane diol ranges from about 98.0 to about 88.0 mole percent, plus a molar excess of said 1,4-butane diol ranging from about 5.0 to about 120 percent, said mole percentages being based on the total number of moles of said glycols, less the molar excess of the 1,4-butane diol, in said mixture.

2. The copolyesters of claim 1 comprising the polymeric reaction product of the mixture of reactants in which mixture the terephthalic acid or lower $C_1$–$C_4$ dialkyl ester thereof ranges from about 99.5 to about 86.8 mole percent and the dimer acid ranges from about 0.5 to 13.2 mole percent, said mole percentages being based on the total number of moles of said acid constituents or reactive equivalents thereof in said mixture.

3. The copolyesters of claim 1 comprised of the reaction product of a mixture of reactants consisting of dimethyl terephthalate, dimer acid, poly(tetramethylene oxide)glycol having a molecular weight of about 1000 and 1,4-butane diol.

4. A copolyester according to claim 1 in the form of a film ranging in thickness from about 1.1 to about 1.5 mils, said film having a tensile strength of from about 10,700 to about 2,5000 pounds per square inch and an elongation at break ranging from about 360 to about 740 percent.

5. A copolyester according to claim 1 in the form of a molded product.

6. A copolyester according to claim 1 in the form of a filament.

* * * * *